(12) United States Patent
Kakigi

(10) Patent No.: US 12,485,394 B2
(45) Date of Patent: *Dec. 2, 2025

(54) MIXER DEVICE

(71) Applicant: HONDA MOTOR CO., LTD., Tokyo (JP)

(72) Inventor: Sho Kakigi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 694 days.

This patent is subject to a terminal disclaimer.

(21) Appl. No.: 17/881,263

(22) Filed: Aug. 4, 2022

(65) Prior Publication Data

US 2024/0042402 A1 Feb. 8, 2024

(51) Int. Cl.
| | | |
|---|---|---|
| *B01F 35/00* | (2022.01) | |
| *B01F 29/00* | (2022.01) | |
| *B01F 29/10* | (2022.01) | |
| *B01F 29/80* | (2022.01) | |
| *B01F 35/32* | (2022.01) | |

(52) U.S. Cl.
CPC ........ *B01F 35/32025* (2022.01); *B01F 29/10* (2022.01); *B01F 29/4031* (2022.01); *B01F 29/80* (2022.01); *B01F 35/3211* (2022.01)

(58) Field of Classification Search
CPC ............ B01F 35/32025; B01F 35/3211; B01F 35/3204; B01F 2101/28; B01F 27/231; B01F 29/60

See application file for complete search history.

(56) References Cited

U.S. PATENT DOCUMENTS 3,933,340 A * 1/1976 Krull .................... B01F 35/718
                                                    366/150.1
5,197,801 A * 3/1993 Swisher ................. B01F 29/60
                                                    366/175.3

FOREIGN PATENT DOCUMENTS

JP          3160227 U      6/2010

* cited by examiner

*Primary Examiner* — Anshu Bhatia
(74) *Attorney, Agent, or Firm* — Armstrong Teasdale LLP

(57) ABSTRACT

A mixer device 1 includes: a drum 3 configured to store materials to be mixed; a device body 4 configured to rotatably support the drum 3; an electric motor 6 configured to apply a rotational driving force to the drum 3; and a battery 8 configured to supply electric power to the electric motor 6, wherein a wheel 29 is attached to the device body 4, and the battery 8 is arranged above the wheel 29.

10 Claims, 5 Drawing Sheets

MIXER DEVICE

TECHNICAL FIELD

The present invention relates to a mixer device.

BACKGROUND ART

Conventionally, a mixer device for mixing materials to be mixed is known.

For example, Japanese Utility Model Registration No. 3160227 discloses a mixer provided with a mixing tank, an axis body that penetrates the mixing tank, a mixing blade attached to the axis body via an arm in the mixing tank, and a driving motor that rotates the axis body.

However, the above mixer does not have a battery that supplies electric power to the driving motor. Accordingly, so as to operate the driving motor, it is required to supply the electric power from an external fixed power source to the driving motor via a cable. Accordingly, the range of movement of the mixer is limited within the reach of the cable, and thus the mobility of the mixer may decrease.

SUMMARY OF THE INVENTION

In view of the above background, an object of the present invention is to provide a mixer device with high mobility.

To achieve such an object, one aspect of the present invention provides a mixer device (1), comprising: a drum (3) configured to store materials to be mixed; a device body (4) configured to rotatably support the drum; an electric motor (6) configured to apply a rotational driving force to the drum; and a battery (8) configured to supply electric power to the electric motor, wherein a wheel (29) is attached to the device body, and the battery is arranged above the wheel.

According to this aspect, the mixer device comprises the battery configured to supply the electric power to the electric motor. Accordingly, it is not necessary to supply the electric power to the electric motor from an external fixed power source via a cable. Accordingly, the mixer device can be moved freely, and the mobility of the mixer device can be improved.

Further, the battery, which is a heavy object, is arranged above the wheel. Accordingly, the wheel can stably come into contact with an installation surface of the mixer device owing to the load of the battery. Accordingly, the mobility of the mixer device can be further improved.

In the above aspect, preferably, the drum is configured to tilt around a tilt axis (Y) extending in a horizontal direction, and a lower end of the battery is arranged lower than the tilt axis.

According to this aspect, the center of gravity of the mixer device can be lowered. Accordingly, the stability of the mixer device can be improved.

In the above aspect, preferably, the lower end of the battery is arranged lower than a lower end of the drum.

According to this aspect, the center of gravity of the mixer device can be further lowered. Accordingly, the stability of the mixer device can be further improved.

In the above aspect, preferably, the drum is configured to tilt around a tilt axis (Y) extending in a horizontal direction, the device body includes a pair of leg portions (24, 25) arranged on both sides of the drum in the horizontal direction, and the battery is arranged on an opposite side of the drum with respect to one of the leg portions.

According to this aspect, the battery can be arranged so as not to overlap with the tilting trajectory of the drum, so that the tilting space of the drum can be secured.

In the above aspect, preferably, the battery includes: a battery pack (61); and a battery case (62) configured to detachably store the battery pack.

According to this aspect, when the mixer device is not in use, the mixer device can be moved in a state where the battery pack is detached from the battery case. Accordingly, the mobility of the mixer device can be further improved.

In the above aspect, preferably, the battery pack is attached to the battery case from above.

According to this aspect, it is possible to prevent the battery pack from falling from the battery case when the drum swings in response to the rotation of the drum.

In the above aspect, preferably, the device body includes a first leg portion (24) and a second leg portion (25) arranged on both sides of the drum in a horizontal direction, the wheel is attached to a lower end of the first leg portion, a lower end of the second leg portion is in contact with an installation surface (G) of the mixer device, and when a handle (5) arranged above the second leg portion is lifted, the lower end of the second leg portion separates from the installation surface.

According to this aspect, it is possible to easily move the mixer device by lifting the handle and pushing the mixer device horizontally. Accordingly, the mobility of the mixer device can be further improved.

In the above aspect, preferably, the battery is arranged on an opposite side of the handle with respect to the drum.

According to this aspect, the battery, which is a heavy object, is arranged above the wheel and on the opposite side of the handle, so that the handle can be lifted with a light force. Accordingly, the mobility of the mixer device can be further improved.

In the above aspect, preferably, the battery is arranged on an opposite side of the electric motor with respect to the drum.

According to this aspect, the battery, which is a heavy object, is arranged on the opposite side of the electric motor, which is a heavy object, so that the weight balance of the mixer device can be improved. Accordingly, the stability of the mixer device can be improved.

In the above aspect, preferably, the battery is arranged on the same side as the electric motor with respect to the drum.

According to this aspect, the wheel can stably come into contact with the installation surface of the mixer device owing to the load of the battery and the electric motor. Accordingly, the mobility of the mixer device can be further improved.

In the above aspect, preferably, the battery is arranged so as to overlap with the wheel in a top view.

According to this aspect, the wheel can more stably come into contact with the installation surface of the mixer device owing to the load of the battery. Accordingly, the mobility of the mixer device can be further improved.

Thus, according to the above aspects, it is possible to provide a mixer device with high mobility.

BRIEF DESCRIPTION OF THE DRAWING(S)

DETAILED DESCRIPTION OF THE INVENTION

<Concrete Mixer 1>

Hereinafter, a concrete mixer 1 (an example of a mixer device) according to the embodiment of the present invention will be described with reference to the drawings. The concrete mixer 1 is a device for mixing materials to be mixed such as cement, aggregate (sand and gravel), water, admixture, and the like to produce concrete.

Figure 1:
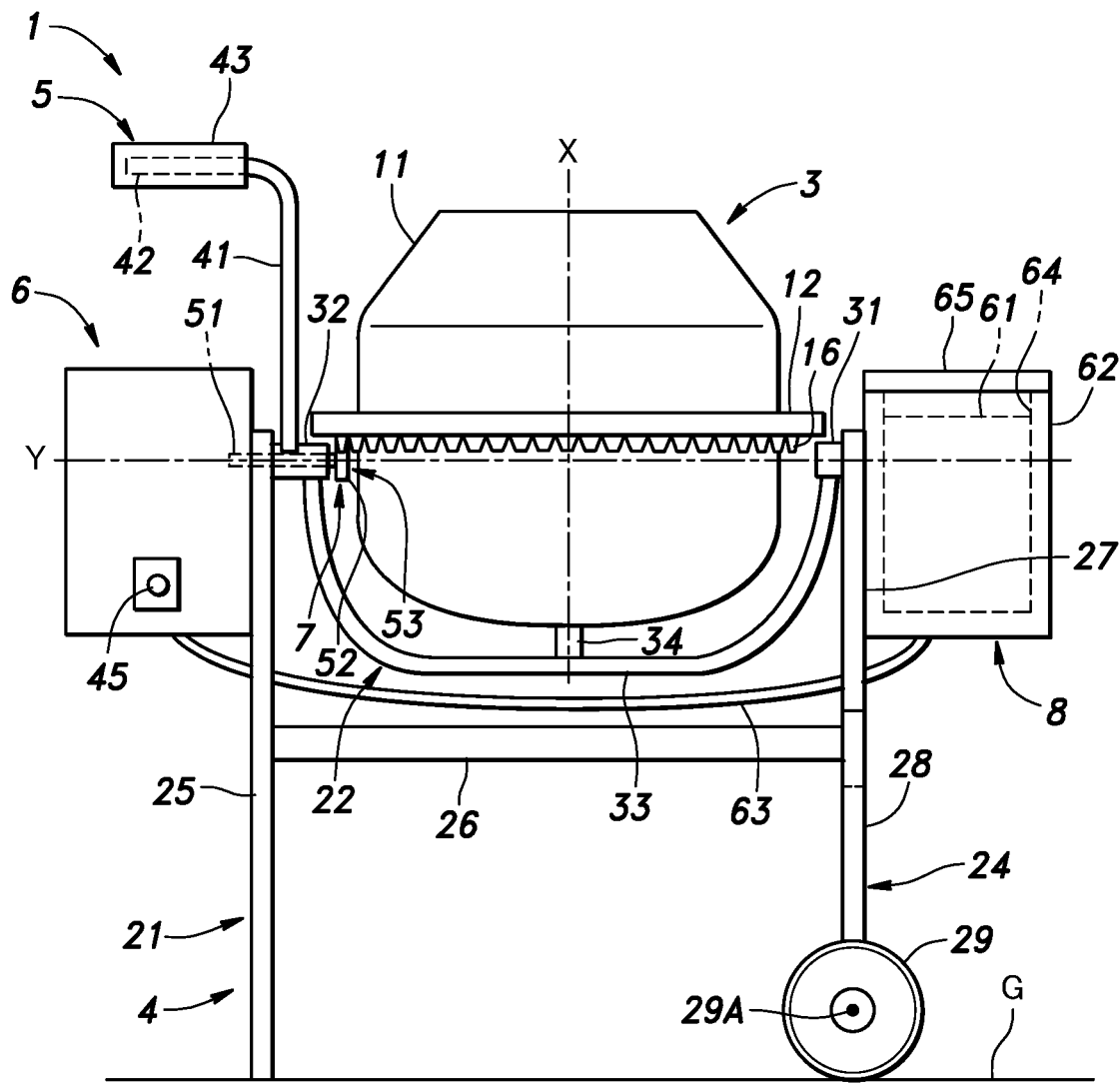
FIG. 1 is a front view showing a state where a drum is in a reference posture in a mixer device according to an embodiment of the present invention.
Figure 2:
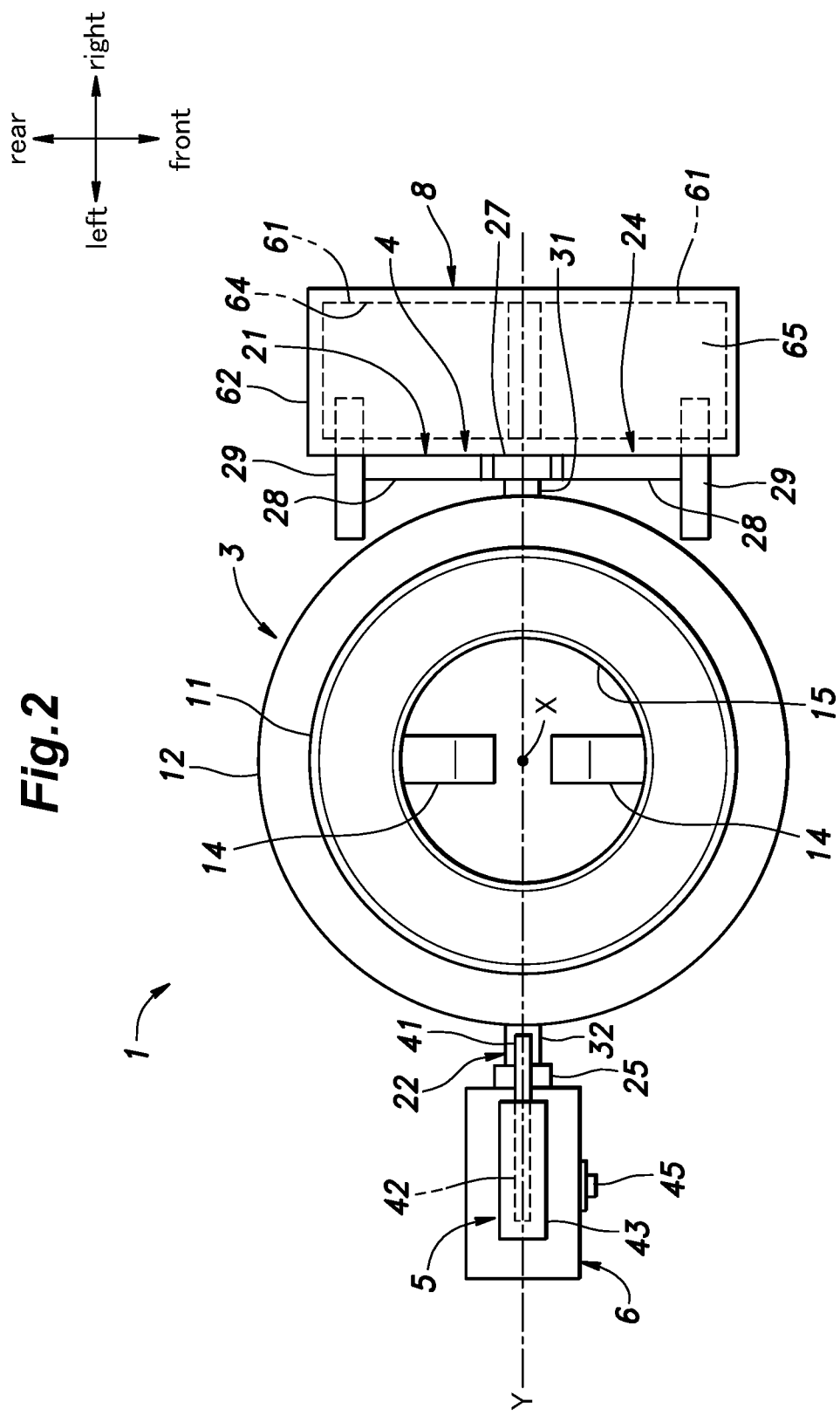
FIG. 2 is a plan view showing the state where the drum is in the reference posture in the mixer device according to the embodiment of the present invention.

With reference to FIGS. 1 and 2, the concrete mixer 1 includes a drum 3 configured to store the materials to be mixed, a device body 4 configured to rotatably support the drum 3, a handle 5 attached to the device body 4, an electric motor 6 configured to apply a rotational driving force to the drum 3, a transmission member 7 configured to transmit the rotational driving force of the electric motor 6 to the drum 3, and a battery 8 configured to supply electric power to the electric motor 6. Hereinafter, the components of the concrete mixer 1 will be described one by one.

<Drum 3>

Figure 3:
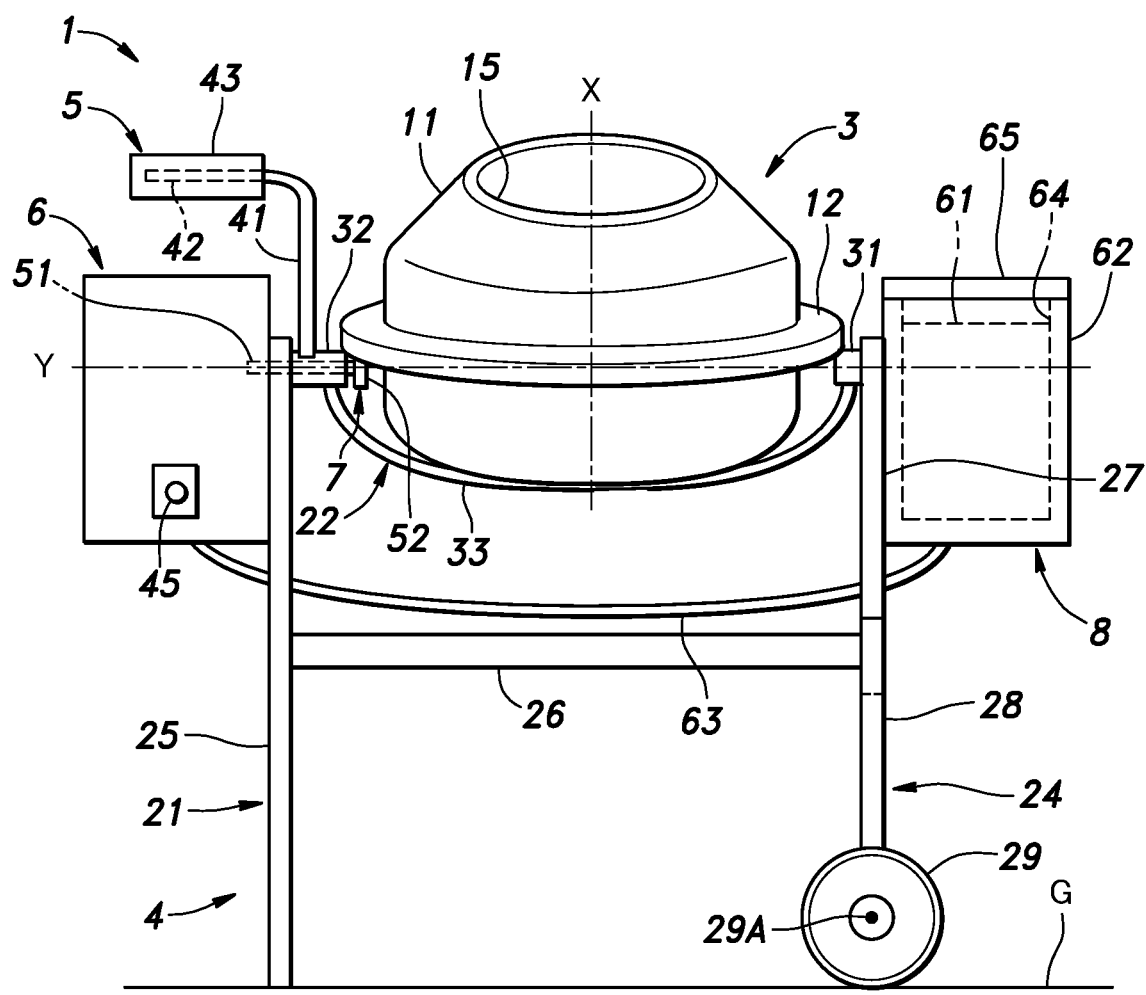
FIG. 3 is a front view showing a state where the drum is in a tilt posture in the mixer device according to the embodiment of the present invention.

The drum 3 of the concrete mixer 1 is a hollow member. The drum 3 is configured to rotate around a rotation axis X. Further, the drum 3 is configured to tilt around a tilt axis Y extending in the lateral direction (horizontal direction). That is, the axial direction of the tilt axis Y is the lateral direction. As the drum 3 tilts around the tilt axis Y, the posture of the drum 3 switches from a reference posture (see FIGS. 1 and 2) to a tilt posture (see FIG. 3). The reference posture is a posture in which the rotation axis X extends along the vertical direction. The tilt posture is a posture in which the rotation axis X tilts with respect to the vertical direction. Hereinafter, the components of the concrete mixer 1 will be described based on a state where the drum 3 is in the reference posture.

With reference to FIGS. 1 and 2, the drum 3 includes a drum body 11 with a bottomed cylindrical shape around the rotation axis X and an annular flange 12 protruding from an outer circumferential surface of the drum body 11. A plurality of stirring blades 14 are fixed inside the drum body 11. A circular feeding port 15 is opened at an upper end of the drum body 11, and the materials to be mixed are fed into the drum body 11 through the feeding port 15. A rack gear 16 is provided on a lower surface of the flange 12 over an entire circumference of the flange 12.

<Device Body 4>

The device body 4 of the concrete mixer 1 includes a support member 21 and a rotating member 22 rotatably supported by the support member 21.

The support member 21 includes a pair of leg portions 24, 25 (a first leg portion 24 and a second leg portion 25) arranged on both sides of the drum 3 in the lateral direction (horizontal direction) and a coupling portion 26 extending in the lateral direction (horizontal direction) and coupling the pair of leg portions 24, 25.

The first leg portion 24 of the support member 21 includes an upper frame 27 extending linearly in the up-and-down direction and a pair of lower frames 28 extending from a lower end of the upper frame 27 to a lower front side and a lower rear side. A pair of wheels 29 are rotatably attached to lower ends of the pair of lower frames 28. Each wheel 29 is rotatably provided around an axis 29A. The concrete mixer 1 does not have a drive source for rotating the wheel 29 (a drive source to cause the concrete mixer 1 to travel). That is, the concrete mixer 1 is not a device that travels by itself but a device that travels as being pushed by a hand.

The second leg portion 25 of the support member 21 extends linearly in the up-and-down direction. The wheel 29 is not attached to a lower end of the second leg portion 25. The lower end of the second leg portion 25 is in contact with the ground G (an example of an installation surface of the concrete mixer 1).

The coupling portion 26 of the support member 21 is arranged below the drum 3. A right end of the coupling portion 26 is fixed to a lower end of the upper frame 27 of the first leg portion 24. A left end of the coupling portion 26 is fixed to the center of the second leg portion 25 in the up-and-down direction.

The rotating member 22 includes a pair of engagement tubular portions 31, 32 (a first engagement tubular portion 31 and a second engagement tubular portion 32) arranged on both sides in the lateral direction of the drum 3, and a connecting portion 33 that connects the pair of engagement tubular portions 31, 32.

The pair of engagement tubular portions 31, 32 of the rotating member 22 has a cylindrical shape around the tilt axis Y. The first engagement tubular portion 31 is rotatably engaged with the upper frame 27 of the first leg portion 24 of the support member 21. The second engagement tubular portion 32 is rotatably engaged to an upper portion of the second leg portion 25 of the support member 21.

The connecting portion 33 of the rotating member 22 has a substantially U-shape protruding downward. A right end of the connecting portion 33 is fixed to the first engagement tubular portion 31. A left end of the connecting portion 33 is fixed to the second engagement tubular portion 32. A central portion of the connecting portion 33 in the lateral direction extends below the drum body 11 in the lateral direction. At the central portion of the connecting portion 33 in the lateral direction, a bearing 34 protruding upward is provided. The bearing 34 is engaged with a lower end of the drum body 11, and rotatably supports the drum 3.

<Handle 5>

The handle 5 of the concrete mixer 1 is arranged above the second leg portion 25 of the support member 21 of the device body 4. The handle 5 includes a first arm 41 extending in the up-and-down direction and a second arm 42 extending from an upper end of the first arm 41 to a left side (an outside in the lateral direction). A lower end of the first arm 41 is fixed to the second engagement tubular portion 32 of the rotating member 22 of the device body 4. A grip 43 is fixed to an outer circumference of the second arm 42.

<Electric Motor 6>

The electric motor 6 of the concrete mixer 1 is arranged on the same side of the handle 5 with respect to the drum 3. The electric motor 6 is arranged on an opposite side of the drum 3 with respect to the second leg portion 25 of the support member 21 of the device body 4. The electric motor 6 is fixed to an upper portion of the second leg portion 25. The electric motor 6 has a rotatable motor shaft (not shown). A power switch 45 is provided on a front surface of the electric motor 6.

<Transmission Member 7>

The transmission member 7 of the concrete mixer 1 includes a transmission shaft 51 extending in the lateral direction along the tilt axis Y and a pinion gear 52 fixed to a right end of the transmission shaft 51. The transmission shaft 51 penetrates the second engagement tubular portion 32 of the rotating member 22 of the device body 4, and is rotatably supported by the second engagement tubular portion 32. The transmission shaft 51 is connected to the motor shaft (not shown) of the electric motor 6. The transmission shaft 51 may be directly fixed to the motor shaft of the electric motor 6, or indirectly connected to the motor shaft of the electric motor 6 via a gear mechanism or the like. The pinion gear 52 meshes with the rack gear 16 provided on the lower surface of the flange 12 of the drum 3. Accordingly, the pinion gear 52 and the rack gear 16 compose a rack-and-pinion mechanism 53.

<Battery 8>

With reference to FIG. 1, an upper end of the battery 8 of the concrete mixer 1 is arranged higher than the tilt axis Y. A lower end of the battery 8 is arranged lower than the tilt axis Y. The lower end of the battery 8 is arranged lower than a lower end of the drum 3.

The battery 8 is arranged on the opposite side of the drum 3 with respect to the first leg portion 24 of the support member 21 of the device body 4. The battery 8 is arranged on the opposite side of the handle 5 and the electric motor 6 with respect to the drum 3. The battery 8 is arranged at the same height as the drum 3 and the electric motor 6.

With reference to FIG. 2, the battery 8 is arranged above the pair of wheels 29 so as to overlap with portions of the pair of wheels 29 in a top view. In another embodiment, the battery 8 may be arranged so as to overlap with the entirety of the pair of wheels 29 in a top view, or arranged so as to overlap with a portion or the entirety of only one of the wheels 29 in a top view. Further, in another embodiment, the battery 8 may be arranged between the pair of wheels 29 in a top view. That is, the battery 8 does not have to overlap with the pair of wheels 29 in a top view. In this case, the battery 8 is preferably arranged on a straight line connecting the axes 29A of the pair of wheels 29 in a top view.

With reference to FIGS. 1 and 2, the battery 8 includes a plurality of battery packs 61 and a battery case 62 configured to detachably store the plurality of battery packs 61. In another embodiment, the battery 8 may include only one battery pack 61. The plurality of battery packs 61 and the battery case 62 partially overlap with the pair of wheels 29 in a top view.

For example, each battery pack 61 consists of a secondary battery such as a lithium-ion battery. The battery pack 61 is connected to the electric motor 6 via a cable 63 and configured to supply the electric power to the electric motor 6.

The battery case 62 is fixed to the first leg portion 24 of the support member 21 of the device body 4. An opening 64 for attaching and detaching each battery pack 61 is provided on an upper surface of the battery case 62. The battery pack 61 is attached to the battery case 62 from above via the opening 64. In another embodiment, the opening 64 may be provided on a surface (for example, a front surface) other than the upper surface of the battery case 62. The opening 64 is covered with an openable cover 65.

<Operation of the Concrete Mixer 1>

When using the concrete mixer 1, the user switches on the power switch 45 of the electric motor 6 in a state where the drum 3 is in the tilt posture. Accordingly, the electric motor 6 operates, and thus the motor shaft (not shown) of the electric motor 6 rotates. The rotation of the motor shaft of the electric motor 6 is transmitted to the transmission member 7, and thus the transmission member 7 rotates. The rotation of the transmission member 7 is transmitted to the flange 12 of the drum 3 via the rack-and-pinion mechanism 53, and thus the drum 3 rotates around the rotation axis X. Accordingly, the materials to be mixed stored in the drum 3 are mixed, and thus concrete is generated.

<Tilt of the Drum 3>

When the user operates the handle 5 forward in a state where the drum 3 is in the reference posture (see FIGS. 1 and 2), the handle 5, the rotating member 22 of the device body 4, and the drum 3 rotate integrally in one direction around the tilt axis Y. Accordingly, the posture of the drum 3 is switched from the reference posture to the tilt posture (see FIG. 3). That is, the drum 3 tilts.

On the other hand, when the user operates the handle 5 rearward in a state where the drum 3 is in the tilt posture, the handle 5, the rotating member 22 of the device body 4, and the drum 3 rotate around the tilt axis Y in the direction opposite to the above one direction. Accordingly, the posture of the drum 3 is switched from the tilt posture to the reference posture. That is, the tilt of the drum 3 is canceled.

<Movement of the Concrete Mixer 1>

Figure 4:
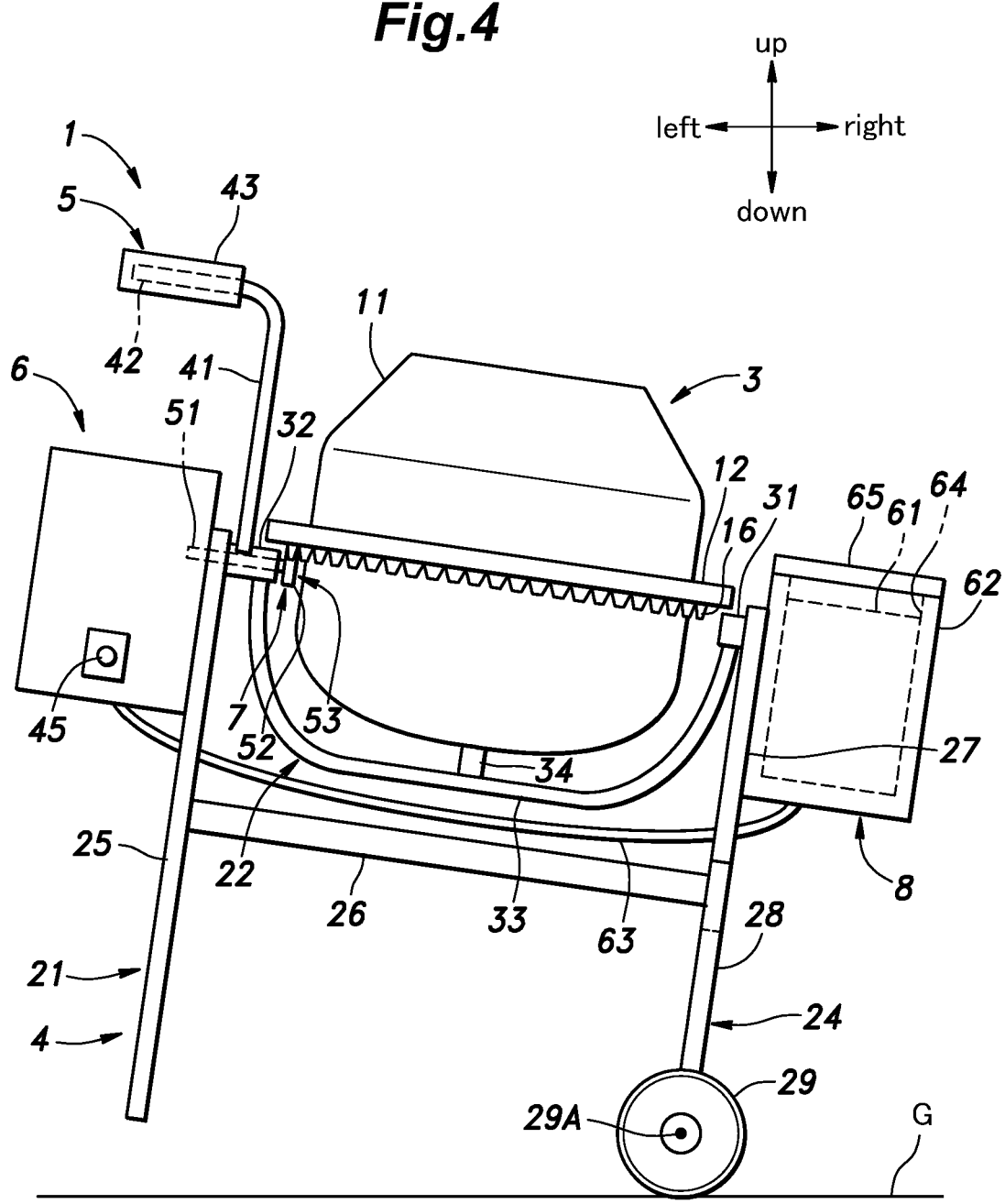
FIG. 4 is a front view showing a state where a handle is lifted in the mixer device according to the embodiment of the present invention.

With reference to FIG. 4, when moving the concrete mixer 1, the user lifts the handle 5 to separate the lower end of the second leg portion 25 of the device body 4 from the ground G. Accordingly, only each wheel 29 is in contact with the ground G. In this state, when the user pushes any portion of the concrete mixer 1 in the lateral direction, the wheel 29 rotates and the concrete mixer 1 moves.

<Effects>

The concrete mixer 1 according to the present embodiment includes the battery 8 configured to supply the electric power to the electric motor 6. Accordingly, it is not necessary to supply the electric power to the electric motor 6 from an external fixed power source via a cable. Accordingly, the concrete mixer 1 can be moved freely, and the mobility of the concrete mixer 1 can be enhanced.

Further, the battery 8, which is a heavy object, is arranged above the wheels 29. Accordingly, the wheels 29 can stably come into contact with the ground G owing to the load of the battery 8, and the handle 5 can be lifted with a light force. Accordingly, the mobility of the concrete mixer 1 can be further improved.

Further, each battery pack 61 is detachably housed in the battery case 62. Accordingly, when the concrete mixer 1 is not in use, the concrete mixer 1 can be moved in a state where the battery pack 61 is detached from the battery case 62. Accordingly, the mobility of the concrete mixer 1 can be improved. Further, when the concrete mixer 1 is not used, the battery pack 61 can be detached from the battery case 62 and used for a process other than a concrete forming process. Accordingly, the convenience of the battery pack 61 can be enhanced.

Further, each battery pack 61 is attached to the battery case 62 from above. Accordingly, it is possible to prevent the battery pack 61 from falling from the battery case 62 when the drum 3 swings in response to the rotation of the drum 3. In particular, the direction in which the battery pack 61 is attached to and detached from the battery case 62 is different from the swing direction of the drum 3 when the drum 3 is rotated. Accordingly, it is possible to more effectively prevent the battery pack 61 from falling from the battery case 62.

MODIFIED EMBODIMENT

Figure 5:
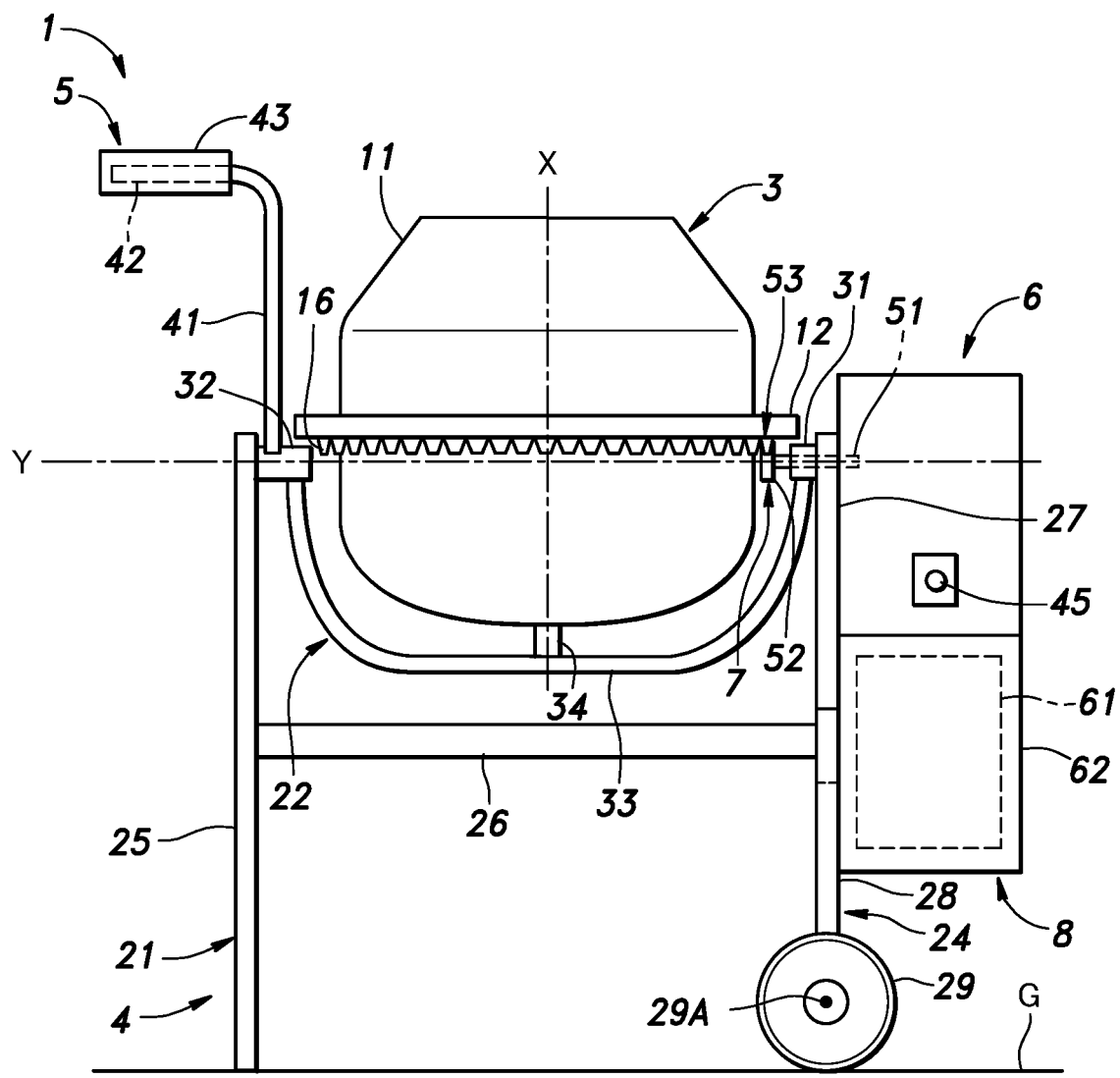
FIG. 5 is a front view showing a state where the drum is in a reference posture in a mixer device according to another embodiment of the present invention.

In the above embodiment, the battery 8 is arranged on the opposite side of the electric motor 6 with respect to the drum 3. In another embodiment, the battery 8 may be arranged on the same side as the electric motor 6 with respect to the drum 3, as shown in FIG. 5. Accordingly, the wheels 29 can stably come into contact with the ground G owing to the load of the battery 8 and the electric motor 6, and the handle 5 can be lifted with a lighter force. Accordingly, the mobility of the concrete mixer 1 can be further improved. If such an arrangement is adopted, the battery 8 may be arranged below the electric motor 6 (see FIG. 5), arranged above the electric motor 6, or arranged on the side of the electric motor 6. That is, the battery 8 may be arranged in any location with respect to the electric motor 6.

In the above embodiment, the electric motor 6 is attached to the support member 21 of the device body 4. In another embodiment, the electric motor 6 may be attached to the rotating member 22 of the device body 4 or the handle 5, and rotate around the tilt axis Y together with the handle 5, the rotating member 22 of the device body 4, and the drum 3.

In the above embodiment, the electric motor 6 rotates the drum 3 via the rack-and-pinion mechanism 53. In another embodiment, the electric motor 6 may be directly connected to a lower end of the drum 3 and rotate the drum 3 directly.

In the above embodiment, the wheels 29 are attached only to the first leg portion 24. In another embodiment, the wheels 29 may be attached to both the leg portions 24, 25.

In the above embodiment, the mixer device according to the present invention is applied to the concrete mixer 1. In another embodiment, the mixer device according to the present invention may be applied to a mixer device other than the concrete mixer 1 (for example, a mixer device that mixes gardening fertilizer or livestock feed). In other words, the mixed material generated by the mixer device according to the present invention does not have to be concrete.

Concrete embodiments of the present invention have been described in the foregoing, but the present invention should not be limited by the foregoing embodiments and various modifications and alterations are possible within the scope of the present invention.

The invention claimed is:

1. A mixer device, comprising:
   a drum configured to store materials to be mixed;
   a device body configured to rotatably support the drum;
   an electric motor configured to apply a rotational driving force to the drum; and
   a battery configured to supply electric power to the electric motor,
   wherein a wheel is attached to the device body, and
   the battery is arranged above the wheel,
   wherein the battery is arranged so as to overlap with the wheel in a top view.

2. The mixer device according to claim 1, wherein the drum is configured to tilt around a tilt axis extending in a horizontal direction, and
   a lower end of the battery is arranged lower than the tilt axis.

3. The mixer device according to claim 2, wherein the lower end of the battery is arranged lower than a lower end of the drum.

4. The mixer device according to claim 1, wherein the drum is configured to tilt around a tilt axis extending in a horizontal direction,
   the device body includes a pair of leg portions arranged on both sides of the drum in the horizontal direction, and
   the battery is arranged on an opposite side of the drum with respect to one of the leg portions.

5. The mixer device according to claim 1, wherein the battery includes:
   a battery pack; and
   a battery case configured to detachably store the battery pack.

6. The mixer device according to claim 5, wherein the battery pack is attached to the battery case from above,
   a lower end of the battery is arranged higher than an axis of the wheel.

7. A mixer device, comprising:
   a drum configured to store materials to be mixed;
   a device body configured to rotatably support the drum;
   an electric motor configured to apply a rotational driving force to the drum; and
   a battery configured to supply electric power to the electric motor,
   wherein a wheel is attached to the device body, and
   the battery is arranged above the wheel,
   wherein the device body includes a first leg portion and a second leg portion arranged on both sides of the drum in a horizontal direction,
   the wheel is attached to a lower end of the first leg portion,
   a lower end of the second leg portion is in contact with an installation surface of the mixer device, and
   when a handle arranged above the second leg portion is lifted, the lower end of the second leg portion separates from the installation surface.

8. The mixer device according to claim 7, wherein the battery is arranged on an opposite side of the handle with respect to the drum.

9. A mixer device, comprising:
   a drum configured to store materials to be mixed;
   a device body configured to rotatably support the drum;
   an electric motor configured to apply a rotational driving force to the drum; and
   a battery configured to supply electric power to the electric motor,
   wherein a wheel is attached to the device body, and
   the battery is arranged above the wheel,
   wherein the battery is arranged on an opposite side of the electric motor with the drum arranged therebetween.

10. The mixer device according to claim 1, wherein the battery is arranged on the same side as the electric motor with respect to the drum.

\* \* \* \* \*